(12) United States Patent
Tojima

(10) Patent No.: US 12,108,174 B2
(45) Date of Patent: Oct. 1, 2024

(54) IMAGING SENSOR, IMAGING APPARATUS, AND IMAGING METHOD

(71) Applicant: CANON KABUSHIKI KAISHA, Tokyo (JP)

(72) Inventor: Kenzo Tojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,108

(22) Filed: Nov. 9, 2022

(65) Prior Publication Data

US 2023/0156358 A1    May 18, 2023

(30) Foreign Application Priority Data

Nov. 16, 2021 (JP) ................................. 2021-186602

(51) Int. Cl.
*H04N 25/589* (2023.01)
*H04N 25/571* (2023.01)

(52) U.S. Cl.
CPC ......... *H04N 25/589* (2023.01); *H04N 25/573* (2023.01); *H04N 25/575* (2023.01)

(58) Field of Classification Search
CPC ... H04N 25/589; H04N 25/575; H04N 25/573
USPC ........................................................ 348/207.99
See application file for complete search history.

(56) References Cited

U.S. PATENT DOCUMENTS

| | | | |
|---|---|---|---|
| 9,210,350 B2 | 12/2015 | Dai et al. | |
| 2015/0163429 A1* | 6/2015 | Dai | H04N 25/581 348/295 |
| 2016/0027387 A1* | 1/2016 | Park | G09G 3/3611 345/88 |
| 2019/0288150 A1* | 9/2019 | Miyamoto | H01L 27/14643 |

* cited by examiner

*Primary Examiner* — Joel W Fosselman
(74) *Attorney, Agent, or Firm* — Canon U.S.A., Inc. IP Division

(57) ABSTRACT

In a case where illuminance is high, an error between the number of photons per frame calculated from time information and the number of photons and the actually expected number of photons per frame is reduced. In a time counter that counts a clock from the start of exposure in one frame, one-count time in the clock is switched depending on the illuminance. In a case where a pixel counter is saturated within a period of one frame, the illuminance is determined to be high, and a high-illuminance clock in which one-count time is set more minutely in the first half of one frame is used to count. In a case where the illuminance is not determined to be high, a normal clock is used to count.

12 Claims, 12 Drawing Sheets

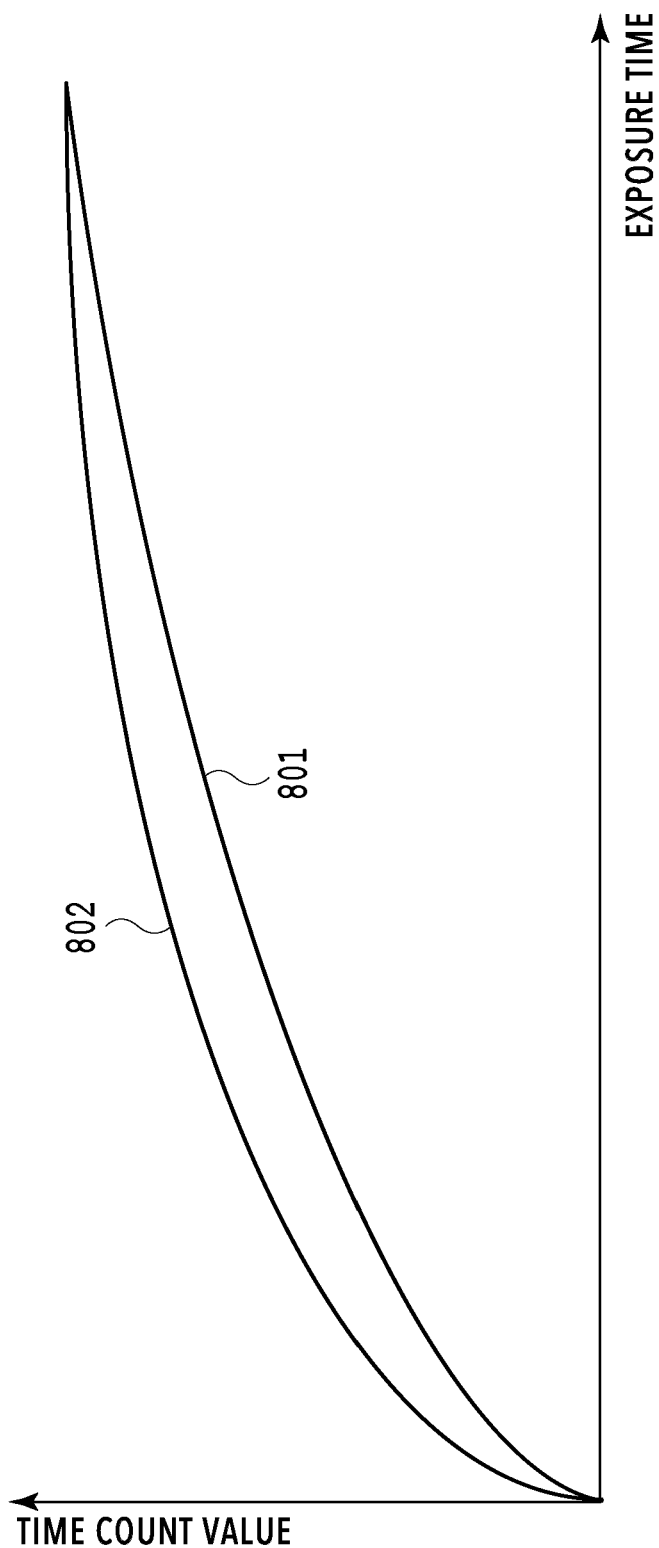

IMAGING SENSOR, IMAGING APPARATUS, AND IMAGING METHOD

TECHNICAL FIELD

The aspect of the embodiments relates to an imaging sensor, an imaging apparatus, and an imaging method.

DESCRIPTION OF THE RELATED ART

There is known a photoelectric conversion apparatus that digitally counts the number of photons arriving at an avalanche photodiode and outputs the counted value from a pixel as a photoelectrically converted digital signal. The advantage of digitizing a pixel signal is great in terms of an increase in noise resistance and convenience in signal arithmetic processing, and imaging sensors in which a plurality of pixels that output a photoelectrically converted digital signal are arranged are becoming popular. There is known a method by which, in a case where the number of counted photons reaches a threshold in a time shorter than one frame in the imaging sensor, the time is measured to calculate the number of photons per frame from time information and the number of photons which have reached the threshold.

For example, in an imaging apparatus disclosed in U.S. Pat. No. 9,210,350, there is proposed a method by which each time a time counter for measuring exposure time is incremented, a one-count period is doubled and as time moves on to the half latter of one frame, the time is roughly measured.

In the above-described method of calculating the number of photons per frame, assuming that a threshold is TH, one frame is Fms, and time until the number of photons reaches the threshold is Tms, the number of photons P per frame is calculated by the following formula.

$$P = TH \times F/T \quad \text{(Formula 1)}$$

As time T to reach the threshold moves on to the latter half of one frame, F/T infinitely approaches 1, and an effect on the number of photons P decreases. Thus, the arithmetic processing can be simplified by roughly measuring time as the time moves on to the latter half of one frame.

However, even by the method disclosed in U.S. Pat. No. 9,210,350, there is an issue that, in a case where the number of photons reaches the threshold at an early time within one frame in the case of high illuminance, an error between the calculated number of photons per frame and the actually expected number of photons per frame increases.

SUMMARY

A sensor in which a pixel including a conversion unit configured to detect incidence of a photon and a processing unit configured to process a pulse generated by photon detection in the conversion unit are arranged two-dimensionally, the processing unit includes a time counter configured to count a clock from a start of exposure in one frame, a pixel counter configured to count a number of pulses from the start of exposure in the one frame, a determination unit configured to determine whether a counter value of the pixel counter reaches a threshold within the one frame, and a selector configured to switch the clock supplied to the time counter according to a result of determination by the determination unit.

Further features of the disclosure will become apparent from the following description of exemplary embodiments with reference to the attached drawings.

BRIEF DESCRIPTION OF THE DRAWINGS

FIG. 8 is a diagram showing a relationship between an exposure time and a time count value in the case of high illuminance and low illuminance according to the first embodiment;

DESCRIPTION OF THE EMBODIMENTS

Embodiments of the disclosure will be described in detail below with reference to the drawings.

First Embodiment

Figure 1:
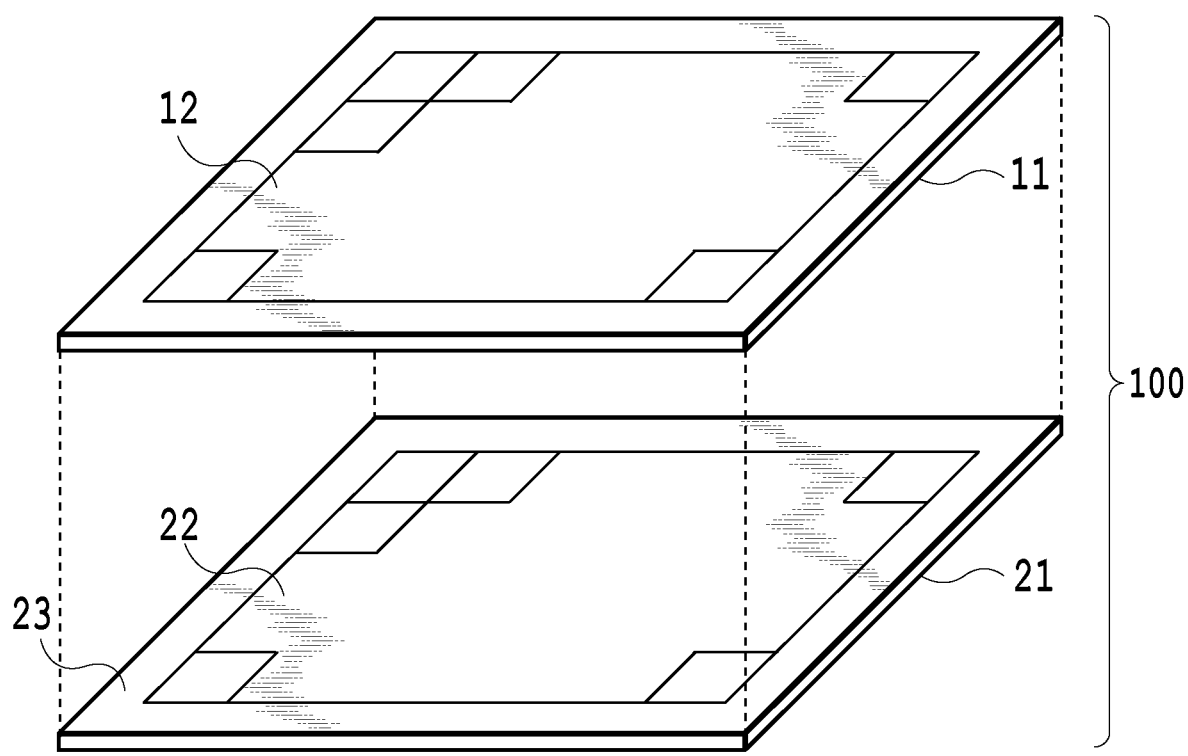
FIG. 1 is a diagram showing a configuration example of an imaging sensor according to the exemplary embodiment.

FIG. 1 is a diagram showing a configuration example of an imaging sensor according to the exemplary embodiment. An imaging sensor 100 includes two chips, a sensor chip 11 and a circuit chip 21 which are layered and electrically connected to each other. The sensor chip 11 includes a pixel area 12. The circuit chip 21 includes a pixel circuit area 22 for processing a signal detected in the pixel area 12 and a readout circuit area 23 for reading out a signal from the pixel circuit area 22.

Figure 2:
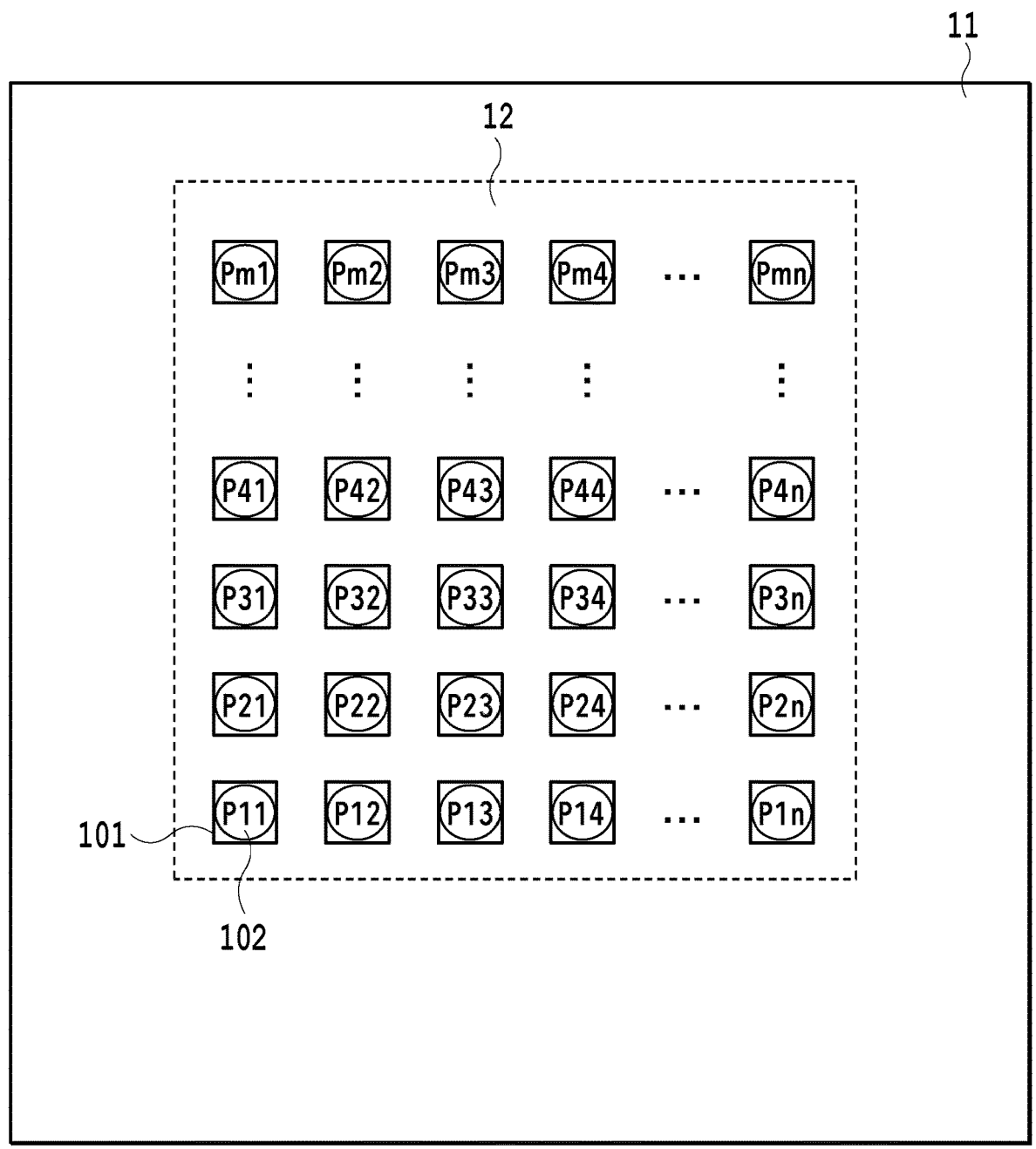
FIG. 2 is a diagram showing a configuration example of a sensor chip according to the exemplary embodiment.

FIG. 2 is a diagram showing a configuration example of the sensor chip 11 according to the exemplary embodiment. The pixel area 12 of the sensor chip 11 includes a plurality of pixels 101 two-dimensionally arranged in a plurality of row and column directions. Each pixel 101 includes a photoelectric conversion unit 102 including an avalanche photodiode (hereinafter, the APD). FIG. 2 shows a portion of the m×n pixels 101 arranged in m rows from a first row to an mth row and n columns from a first column to an nth column with codes indicating row numbers and column numbers. For example, the pixel 101 arranged in the first row and the third column is denoted by "P13." It should be noted that the number of rows and the number of columns of pixel arrays forming the pixel area 12 are not specifically limited.

Figure 3:
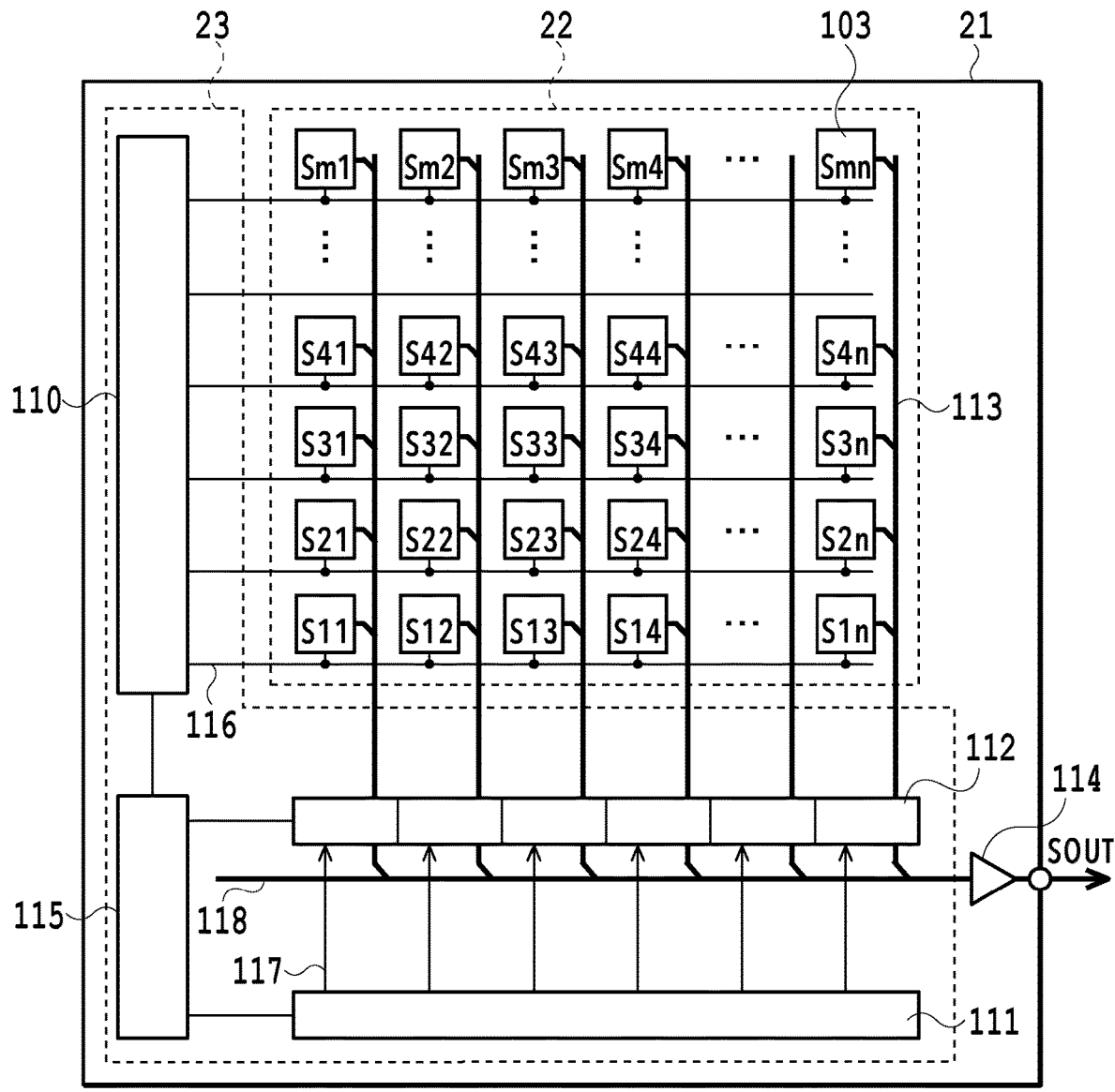
FIG. 3 is a diagram showing a configuration example of a circuit chip according to the exemplary embodiment.

FIG. 3 is a diagram showing a configuration example of the circuit chip 21 according to the exemplary embodiment. The circuit chip 21 includes the pixel circuit area 22 and the readout circuit area 23.

The pixel circuit area 22 includes a plurality of signal processing units 103 arranged two-dimensionally in a plurality of row and column directions. FIG. 3 shows a portion of the m×n signal processing units 103 arranged in m rows from a first row to an mth row and n columns from a first column to an nth column with codes indicating row numbers and column numbers. For example, the signal processing unit 103 arranged in the first row and the third column is denoted by "S13". It should be noted that the number of rows and the number of columns of a signal processing unit array forming the pixel circuit area 22 are not specifically limited.

The readout circuit area 23 includes a vertical scanning circuit 110, a horizontal scanning circuit 111, a column circuit 112, an output circuit 114, and a control pulse generation unit 115.

A control line 116 extending in a first direction (a lateral direction in FIG. 3) is arranged in each row of the signal processing unit array in the pixel circuit area 22. The control lines 116 are connected to the signal processing units 103 arranged in the first direction. The first direction in which the control lines 116 extend is sometimes referred to as a row direction or a horizontal direction.

The control line 116 for each row is connected to a vertical scanning circuit 110. The vertical scanning circuit 110 supplies a control signal for driving the signal processing unit 103 to the signal processing unit 103 via the control line 116.

In each column of the signal processing unit array in the pixel circuit area 22, a signal line 113 extending in a second direction (a longitudinal direction in FIG. 3) intersecting the first direction is arranged. The signal lines 113 are connected to the signal processing units 103 arranged in the second direction. The second direction in which the signal lines 113 extend is sometimes referred to as a column direction or a vertical direction. Each of the signal lines 113 includes n signal lines for outputting an n-bit digital signal.

The signal line 113 in each column is connected to the column circuit 112. The column circuit 112 is provided corresponding to each column of the signal processing unit array in the pixel circuit area 22 and connected to the signal line 113 in a corresponding column. The column circuit 112 has the function of holding a signal read out from the signal processing unit 103 via the signal line 113 in the corresponding column.

The horizontal scanning circuit 111 supplies the column circuit 112 with a control signal for reading out a signal from the column circuit 112. The horizontal scanning circuit 111 supplies a control signal to the column circuit 112 in each column via a control line 117. The column circuit 112 which has received the control signal from the horizontal scanning circuit 111 outputs the held signal to the output circuit 114 via a horizontal output line 118. The horizontal output line 118 includes n signal lines for outputting an n-bit digital signal.

The output circuit 114 outputs a signal corresponding to a pixel signal as an output signal SOUT from the imaging sensor to an image processing unit of an imaging apparatus such as a digital camera, for example.

The control pulse generation unit 115 supplies a control signal for controlling operations of the vertical scanning circuit 110, horizontal scanning circuit 111, and column circuit 112 and timings of the operations. Incidentally, at least some of the control signals for controlling the operations of the vertical scanning circuit 110, horizontal scanning circuit 111, and column circuit 112 and the timings of the operations may be supplied from outside such as a control unit of the imaging apparatus.

Figure 4:
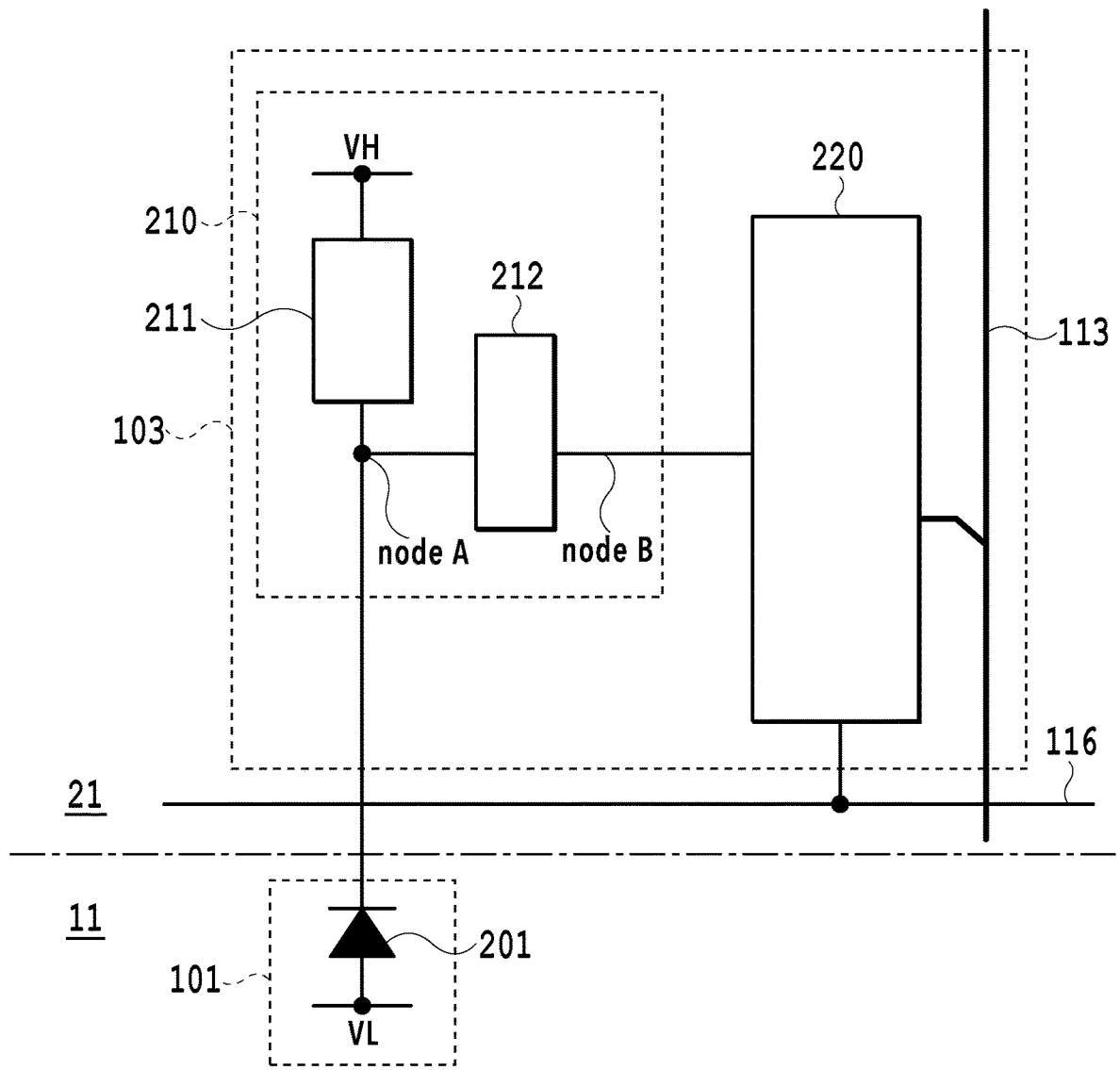
FIG. 4 is an example of an equivalent circuit and block diagram of a pixel and a signal processing unit.

FIG. 4 is an example of an equivalent circuit and block diagram of the pixel 101 in FIG. 2 and the signal processing unit 103 in FIG. 3. The pixel 101 in the sensor chip 11 includes an APD 201, which is a photoelectric conversion unit. In a case where light is incident on the APD 201, a charge pair corresponding to the incident light is generated by photoelectric conversion. An anode of the APD 201 is supplied with a voltage VL (first voltage). Further, a cathode of the APD 201 is supplied with a voltage VH (second voltage) higher than the voltage VL supplied to the anode. The anode and cathode are supplied with a reverse bias voltage such that the APD 201 performs an avalanche multiplication operation. By supplying such a bias voltage, charge generated by the incident light undergoes avalanche multiplication to generate an avalanche current.

In a case where the reverse bias voltage is supplied, there are a Geiger mode in which operation is performed in a case where a potential difference between the anode and cathode is greater than a breakdown voltage and a linear mode in which operation is performed in a case where a potential difference between the anode and cathode is close to or equal to or less than the breakdown voltage.

An APD operated in the Geiger mode is called an SPAD. For example, the voltage VL (first voltage) is −30V, and the voltage VH (second voltage) is 1V.

The signal processing unit 103 in the circuit chip 21 includes a pulse generation unit 210 and a pulse processing unit 220.

The pulse generating unit 210 includes a quench element 211 and a waveform shaping unit 212 and shapes a change in an output from the APD 201 which has detected photon incidence to generate a pulse.

The quench element 211 is connected between a power supply supplying the voltage VH and the cathode of the APD 201. The quench element 211 has the function of replacing the change in the avalanche current generated in the APD 201 with a voltage signal. The quench element 211 functions as a load circuit (a quench circuit) during signal multiplication by avalanche multiplication and has the function of suppressing a voltage supplied to the APD 201 to suppress avalanche multiplication (a quench operation).

The waveform shaping unit 212 shapes a change in the potential (nodeA) of the cathode of the APD 201 obtained during photon detection and outputs (nodeB) a pulse signal. For example, an inverter circuit or a buffer circuit is used for the waveform shaping unit 212.

The pulse processing unit 220 receives a photon detection pulse generated by the pulse generation unit 210, counts the number of photon detection pulses, and measures exposure time from the start of exposure until a counter reaches a predetermined value. A detailed description will be given below with reference to FIG. 5.

Figure 5:
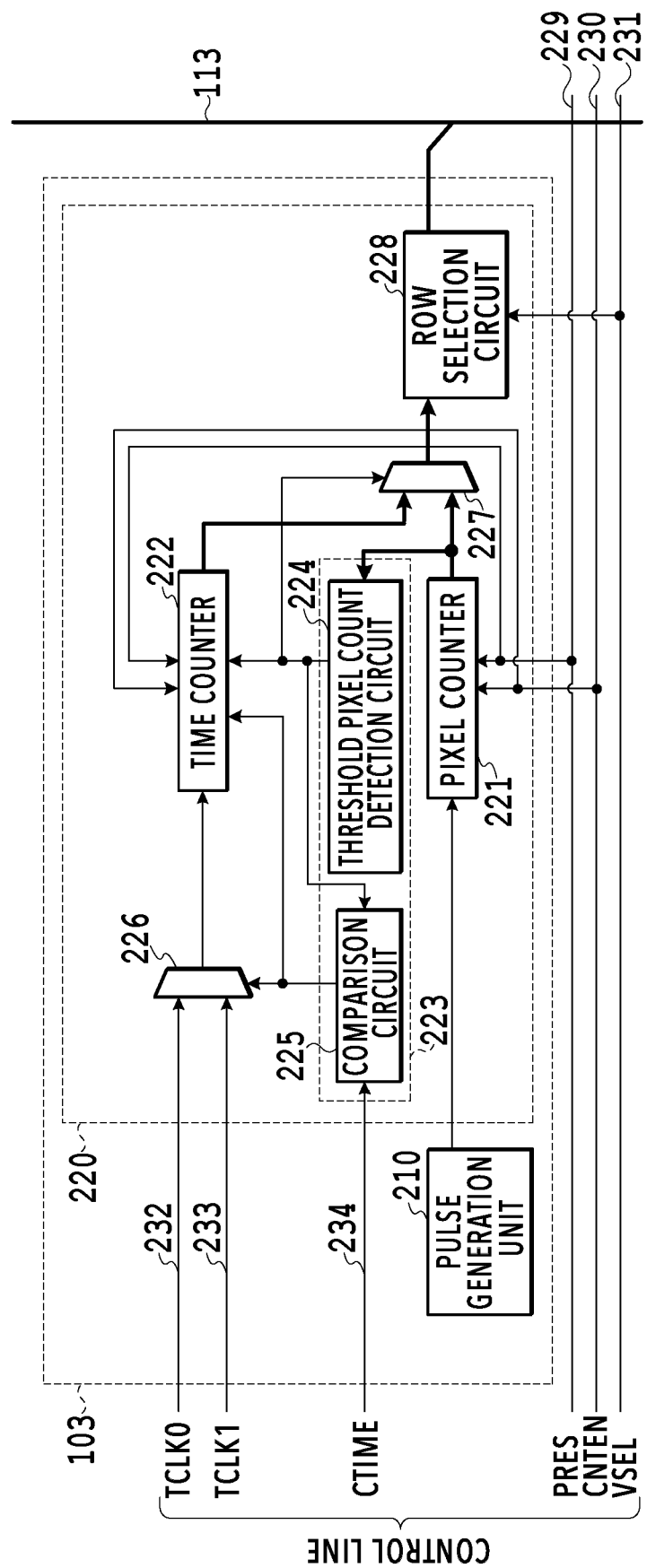
FIG. 5 is a diagram showing a configuration example of a pulse processing unit according to the first embodiment.

FIG. 5 is a diagram showing a configuration example of the pulse processing unit 220 according to the first embodiment. The pulse processing unit 220 includes a pixel counter 221, a time counter 222, an illuminance determination unit 223, selectors 226, 227 and a row selection circuit 228. The illuminance determination unit 223 includes a threshold pixel count detection circuit 224 and a comparison circuit 225.

The pixel counter 221 starts counting in a case where a control signal CNTEN supplied from the control pulse generation unit 115 in FIG. 3 via the vertical scanning circuit 110 and the control line 230 rises, and stops counting in the case of a fall. That is, the control signal CNTEN is a signal for controlling exposure time. The pixel counter 221 counts a pulse signal output from the pulse generation unit 210 during exposure time in one frame. Further, the pixel counter 221 resets a count value in a case where a control signal PRES is supplied from the control pulse generation unit 115 in FIG. 3 via the vertical scanning circuit 110 and the control line 229. The pixel counter 221 is, for example, an 8-bit counter.

The threshold pixel count detection circuit 224 detects that the pixel counter 221 has reached a predetermined threshold and notifies the time counter 222, the comparison circuit 225, and the selector 227. In the first embodiment, the predetermined threshold is a saturation value of an 8-bit counter (every bit 1=255). That is, the predetermined threshold is a maximum value countable by the pixel counter 221, but may be an intermediate value such as 127 or 63.

The time counter 222 starts counting in a case where the control signal CNTEN supplied from the control pulse generation unit 115 in FIG. 3 via the vertical scanning circuit 110 and the control line 230 rises, and ends counting in the case of a fall. The time counter 222 counts time clocks during exposure time in one frame, and stops counting in the case of being notified by the threshold pixel count detection circuit 224 that the pixel counter 221 has reached the saturation value within a period of one frame. In a case where no notification is made that the pixel counter 221 has reached saturation within the period of one frame, the time counter 222 does not stop counting. Further, the time counter 222 resets a count value in a case where the control signal PRES is supplied from the control pulse generation unit 115 in FIG. 3 via the vertical scanning circuit 110 and the control line 229. The time counter 222 is, for example, a 14-bit counter and counts a clock edge of a time clock (TCLK) selected by the selector 226. The details of the time clock will be described later.

The comparison circuit 225 is supplied with a control signal CTIME from the control pulse generation unit 115 in FIG. 3 via the vertical scanning circuit 110 and the control line 234. The comparison circuit 225 compares a control signal CTIME reception timing with a detection timing at which the pixel counter 221 reaches the saturation value, the detection timing being notified from the threshold pixel count detection circuit 224. The comparison circuit 225 notifies the selector 226 and the time counter 222 about which of the control signal CTIME reception timing and the detection timing at which the pixel counter 221 reaches the saturation value is earlier. Incidentally, in a case where the pixel counter 221 does not reach the saturation value, no notification is made from the threshold pixel count detection circuit 224, and the comparison circuit 225 determines that the control signal CTIME reception timing is earlier.

The illuminance determination unit 223 determines that illuminance is high in a case where the detection timing at which the pixel counter 221 reaches the saturation value is earlier than the control signal CTIME reception timing as a result of comparison by the comparison circuit 225. The illuminance determination unit 223 determines that the illuminance is low in a case where the detection timing at which the pixel counter 221 reaches the saturation value is equal to or later than the control signal CTIME reception timing. The illuminance determination unit 223 also determines that the illuminance is low in a case where the pixel counter 221 does not reach the saturation value.

As described above, the control signal CTIME is a reference signal for determining high illuminance, and a time interval from the rise of the control signal CNTEN at the start of one frame to the rise of the control signal CTIME is set in the control pulse generation unit 115.

The selector 226 selects either one of the time clocks (TCLK0/TCLK1) supplied from the control pulse generation unit 115 in FIG. 3 via the vertical scanning circuit 110 and the control lines 232/233 according to a comparison result notified from the comparison circuit 225. In the exemplary embodiment, the TCLK0 is a low-illuminance time clock, and the TCLK1 is a high-illuminance time clock. The selector 226 selects the TCLK0 from the result of comparison by the comparison circuit 225 in a case where the illuminance determination unit 223 determines that the illuminance is low, selects the TCLK1 in a case where the illuminance determination unit 223 determines that the illuminance is high, and supplies the time counter 222. The time clock is a clock signal in which one-count time increases each time the time counter 222 is incremented, as will be described later.

In the first embodiment, the comparison circuit 225 causes a buffer or the like to store the comparison result, notifies the selector 226 at the beginning of a next frame, and switches the time clocks, but may switch the time clocks in real time in the middle of the frame.

The selector 227 selects the output of the time counter 222 in the case of being notified by the threshold pixel count detection circuit 224 that the pixel counter 221 has reached the saturation value within the period of one frame. Otherwise, the selector 227 selects the output of the pixel counter 221 and supplies the row selection circuit 228.

The row selection circuit 228 switches between electrical connection and disconnection between the selector 227 and the signal line 113 according to a control signal VSEL supplied from the control pulse generation unit 115 in FIG. 3 via the vertical scanning circuit 110 and the control line 231. The row selection circuit 228 includes, for example, a buffer circuit for outputting a signal.

Figures 6A, 6B:
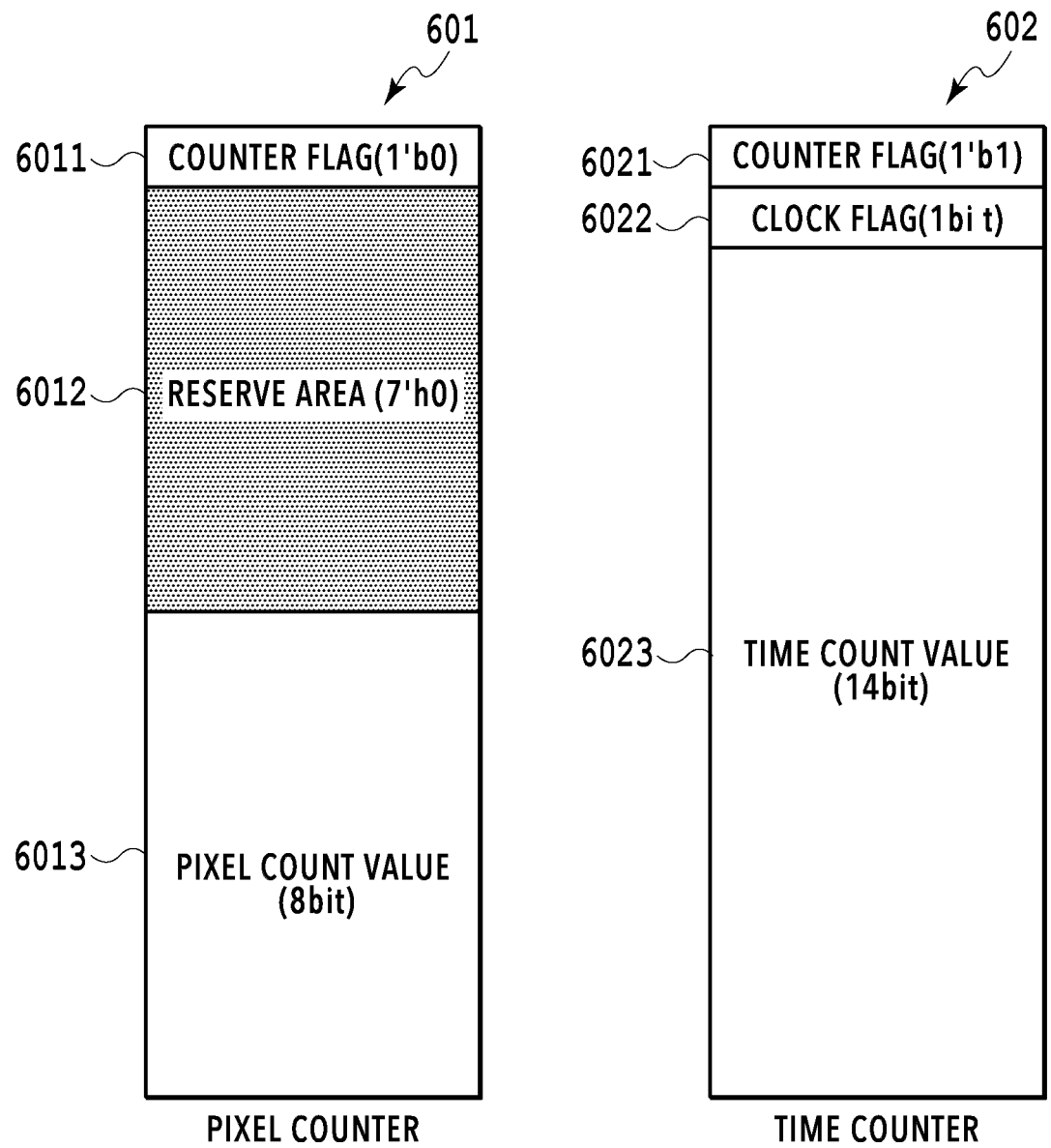
FIGS. 6A and 6B are diagrams showing output formats of a pixel counter and a time counter according to the first embodiment.

FIGS. 6A and 6B are diagrams showing output formats of the pixel counter 221 and the time counter 222 according to the first embodiment. FIG. 6A shows an output format 601 of the pixel counter 221, and FIG. 6B shows an output format 602 of the time counter 222.

The most significant bit of the output format 601 of the pixel counter 221 is provided with a counter flag 6011 indicating whether the data is the output of the pixel counter 221 or the output of the time counter 222 in post-processing (not shown). In the exemplary embodiment, 0 indicates the pixel counter, 1 indicates the time counter, and the counter flag 6011 stores 0.

In order to unify the output bus widths of the pixel counter 221 and the time counter 222 into 16 bits, the output format 601 of the pixel counter 221 is provided with a 7-bit reserve area 6012, where 0 is stored in the exemplary embodiment.

Lower 8 bits of the output format 601 of the pixel counter 221 are provided with an area 6013 for storing a pixel count value.

The pixel counter 221 adds the counter flag 6011 and a reserve area 6012 at a fixed value to form the output format 601 of the pixel counter 221.

The most significant bit of the output format 602 of the time counter 222 is provided with a counter flag 6021 indicating whether the data is the output of the pixel counter 221 or the output of the time counter 222 in the post-processing (not shown). In the exemplary embodiment, 0 indicates the pixel counter, 1 indicates the time counter, and the counter flag 6021 stores 1.

A clock flag 6022 is provided in the output format 602 of the time counter 222. In a case where the data is the output of the time counter 222, the clock flag 6022 indicates which clock edge of the time clocks (TCLK0/TCLK1) is counted in the post-processing (not shown). In the exemplary embodiment, 0 indicates the TCLK0, 1 indicates the TCLK1, and the clock flag 6022 stores either value.

An area 6023 for storing a time count value is provided in lower 14 bits of the output format 602 of the time counter 222.

The time counter 222 further adds 0 to the clock flag 6022 in a case where the illuminance determination unit 223 determines that the illuminance is low and adds 1 to the clock flag 6022 in a case where the illuminance determination unit 223 determines that the illuminance is high from the result of comparison by the comparison circuit 225. As a result, the output format 602 of the time counter 222 is formed. In the exemplary embodiment, the comparison circuit 225 causes a buffer or the like to store the comparison result, notifies the time counter 222 at the beginning of the next frame, and switches the time clocks, but may switch the time clocks in real time in the middle of the frame. At that time, a flag indicating that the time clocks have been switched in the middle of the frame and information indicating time at which switching is performed are added to the output format 602 of the time counter 222.

Figure 7:
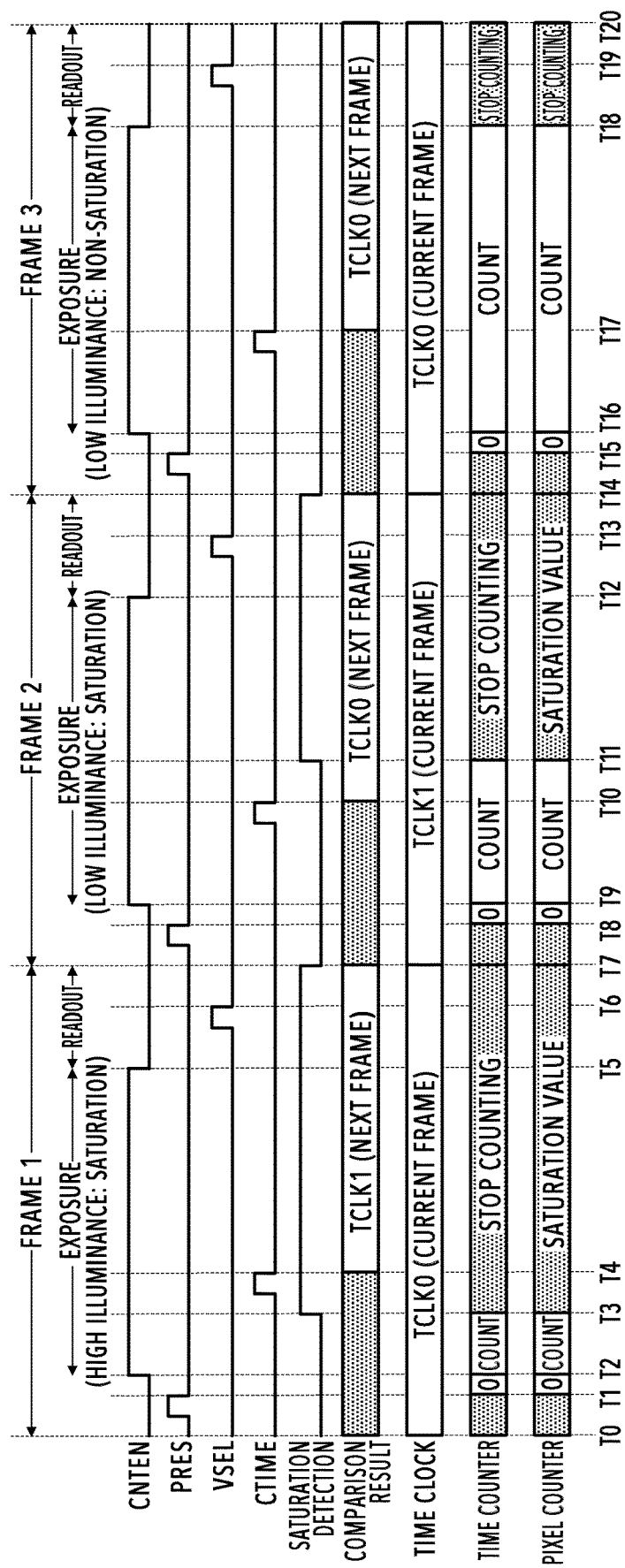
FIG. 7 is a timing chart showing an operation of the pulse processing unit according to the first embodiment.

FIG. 7 is a timing chart showing an operation of the pulse processing unit 220 according to the first embodiment. In the following description, symbol "T" indicates time.

A frame 1 starts at T0.

At T1, a control signal PRES is supplied from the control pulse generation unit 115 in FIG. 3 via the vertical scanning circuit 110 and the control line 229, count values of the pixel counter 221 and the time counter 222 are reset, and 0 is set.

At T2, the control signal CNTEN supplied from the control pulse generation unit 115 in FIG. 3 via the vertical scanning circuit 110 and the control line 230 rises, and counting by the pixel counter 221 and the time counter 222, that is, exposure is started. In the frame 1, a time clock supplied to the time counter 222 is the TCLK0.

At T3, the pixel counter 221 reaches the saturation value and the threshold pixel count detection circuit 224 detects saturation. The time counter 222 is notified by the threshold pixel count detection circuit 224 that the pixel counter 221 has reached the saturation value and stops counting.

At T4, the comparison circuit 225 is supplied with a control signal CTIME from the control pulse generation unit 115 in FIG. 3 via the vertical scanning circuit 110 and the control line 234. Here, a comparison is made between the rise of the control signal CTIME and the rise of a saturation detection signal notified from the threshold pixel count detection circuit 224. In the frame 1, the threshold pixel count detection circuit 224 detects saturation at this point in time, the detection timing at which the pixel counter 221 reaches the saturation value is earlier than the control signal CTIME reception timing, and the illuminance determination unit 223 determines that illuminance is high in the frame 1. The selector 226 selects the TCLK1 in a case where the illuminance determination unit 223 determines that the illuminance is high from the result of comparison by the comparison circuit 225. In the first embodiment, the comparison circuit 225 causes a buffer or the like to store the comparison result, notifies the selector 226 at the beginning of the next frame, and switches the time clocks, so that the TCLK1 is actually selected and used from a frame 2. However, the time clocks may be switched in real time in the middle of the frame 1.

At T5, the control signal CNTEN supplied from the control pulse generation unit 115 in FIG. 3 via the vertical scanning circuit 110 and the control line 230 falls, exposure ends, and the process proceeds to readout. That is, a period from T2 to T5 is an exposure period.

At T6, the row selection circuit 228 is supplied with the control signal VSEL from the control pulse generation unit 115 in FIG. 3 via the vertical scanning circuit 110 and the control line 231. At this point in time, the threshold pixel count detection circuit 224 detects saturation, and as a result, the output format 602 of the time counter 222 selected by the selector 227 is output to the signal line 113.

At T7, the frame 1 ends and the frame 2 starts.

At T8, the control signal PRES is supplied from the control pulse generation unit 115 in FIG. 3 via the vertical scanning circuit 110 and the control line 229, the count values of the pixel counter 221 and the time counter 222 are reset, and 0 is set.

At T9, the control signal CNTEN supplied from the control pulse generation unit 115 in FIG. 3 via the vertical scanning circuit 110 and the control line 230 rises, and counting by the pixel counter 221 and the time counter 222, that is, exposure is started. Since the illuminance determination unit 223 determines that the illuminance is high in the frame 1, a time clock supplied to the time counter 222 in the frame 2 is the TCLK1.

At T10, the comparison circuit 225 is supplied with a control signal CTIME from the control pulse generation unit 115 in FIG. 3 via the vertical scanning circuit 110 and the control line 234. In the frame 2, the threshold pixel count detection circuit 224 does not detects saturation at this point in time, the detection timing at which the pixel counter 221 reaches the saturation value is later than the control signal CTIME reception timing, and the illuminance determination unit 223 determines that the illuminance is low in the frame 2. The selector 226 selects the TCLK0 in a case where the illuminance determination unit 223 determines that the illuminance is low from the result of comparison by the comparison circuit 225. In the first embodiment, the comparison circuit 225 causes a buffer or the like to store the comparison result, notifies the selector 226 at the beginning of the next frame, and switches the time clocks, so that the TCLK0 is actually selected and used from a frame 3. However, the time clocks may be switched in real time in the middle of the frame 2.

At T11, the pixel counter 221 reaches the saturation value and the threshold pixel count detection circuit 224 detects saturation. The time counter 222 is notified by the threshold pixel count detection circuit 224 that the pixel counter 221 has reached the saturation value, and stops counting.

At T12, the control signal CNTEN supplied from the control pulse generation unit 115 in FIG. 3 via the vertical scanning circuit 110 and the control line 230 falls, exposure ends, and the process proceeds to readout. That is, a period from T9 to T12 is the exposure period.

At T13, the row selection circuit 228 is supplied with the control signal VSEL from the control pulse generation unit 115 in FIG. 3 via the vertical scanning circuit 110 and the control line 231. At this point in time, the threshold pixel count detection circuit 224 detects saturation. As a result, the output format 602 of the time counter 222 selected by the selector 227 is output to the signal line 113.

At T14, the frame 2 ends and the frame 3 starts.

At T15, the control signal PRES is supplied from the control pulse generation unit 115 in FIG. 3 via the vertical scanning circuit 110 and the control line 229, the count values of the pixel counter 221 and the time counter 222 are reset, and 0 is set.

At T16, the control signal CNTEN supplied from the control pulse generation unit 115 in FIG. 3 via the vertical scanning circuit 110 and the control line 230 rises, and counting by the pixel counter 221 and the time counter 222, that is, exposure is started. Since the illuminance determination unit 223 determines that the illuminance is low in the frame 2, a time clock supplied to the time counter 222 in the frame 3 is the TCLK0.

At T17, the comparison circuit 225 is supplied with the control signal CTIME from the control pulse generation unit 115 in FIG. 3 via the vertical scanning circuit 110 and the control line 234. In the frame 3, the threshold pixel count detection circuit 224 does not detect saturation at this point in time, the illuminance determination unit 223 determines that the illuminance is low in the frame 3, and the selector 226 continues to select the TCLK0 as in the frame 2 from the result of comparison by the comparison circuit 225.

At T18, the control signal CNTEN supplied from the control pulse generation unit 115 in FIG. 3 via the vertical scanning circuit 110 and the control line 230 falls, the pixel counter 221 and the time counter 222 stop counting, exposure ends, and the process proceeds to readout. That is, a period from T16 to T18 is the exposure period.

At T19, the row selection circuit 228 is supplied with the control signal VSEL from the control pulse generation unit 115 in FIG. 3 via the vertical scanning circuit 110 and the control line 231. At this point in time, the threshold pixel count detection circuit 224 does not detect saturation. As a result, the output format 601 of the pixel counter 221 selected by the selector 227 is output to the signal line 113.

At T20, the frame 3 ends.

Incidentally, the time clock supplied to the time counter 222 is the low-illuminance time clock TCLK0 even though the illuminance determination unit 223 has determined that the illuminance is high in the frame 1. Further, the time clock supplied to the time counter 222 is the high-illuminance time clock TCLK1 even though the illuminance determination unit 223 has determined that the illuminance is low in the frame 2. In the first embodiment, the comparison circuit 225 causes a buffer or the like to store the comparison result, notifies the selector 226 at the beginning of the next frame, and switches the time clocks. Thus, such a state arises in switching from low illuminance to high illuminance or from high illuminance to low illuminance. However, stochastically, a frame with low illuminance or high illuminance tends to continue, and such a state does not arise in a case where the time clocks are switched in real time in the middle of the frame.

FIG. 8 is a diagram showing a relationship between exposure time and a time count value in the case of high illuminance and low illuminance according to the first embodiment. A vertical axis represents the time count value and a horizontal axis represents the exposure time. A logarithmic curve 801 indicates a time count value counted by the low-illuminance time clock TCLK0, and a logarithmic curve 802 indicates a time count value counted by the high-illuminance time clock TCLK1.

The high-illuminance time clock TCLK1 counts the first half of the exposure time at shorter intervals as compared to the low-illuminance time clock TCLK0. That is, one-count time is minutely set each time the time counter 222 is incremented. Thus, the time count value of the logarithmic curve 802 is larger than the time count value of the logarithmic curve 801 in the first half of the exposure time. In a case where saturation occurs in the first half of the exposure time in the case of high illuminance, the high-illuminance time clock TCLK1 counts the first half of the exposure time at short intervals, so that it is possible to increase the accuracy of the number of photons per frame calculated from the time count value and the number of saturated photons.

Figure 9A:
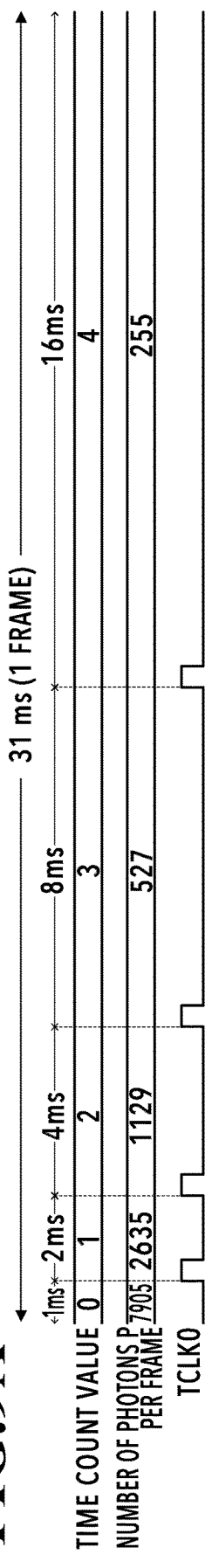
FIGS. 9A and 9B are diagrams showing a relationship between a time count value obtained by using time clocks in the cases of high illuminance and low illuminance and the number of photons P per frame calculated from the time count value and the number of saturated photons according to the first embodiment.
Figure 9B:
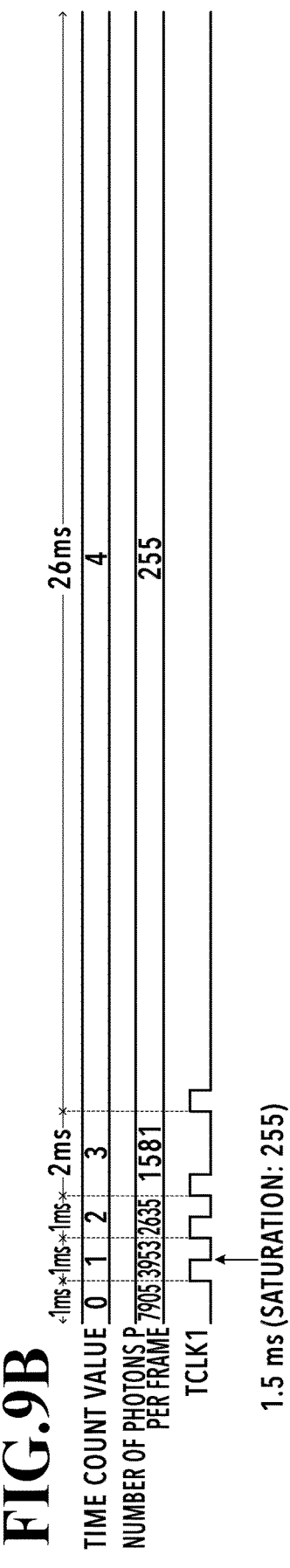

FIGS. 9A and 9B are diagrams showing a relationship between a time count value obtained by using the time clocks in the cases of high illuminance and low illuminance according to the first embodiment and the number of photons P per frame calculated from the time count value and the number of saturated photons.

To facilitate description, the time count value ranges from 0 to 4, that is, the time counter 222 is a 3-bit counter. However, the time counter 222 is, for example, a 14-bit counter and is not limited to the 3-bit counter. Additionally, the saturation value is set to 255 and one frame is set to 31 ms, but this is also an example and the disclosure is not limited to this.

FIG. 9A shows the case of the low-illuminance time clock TCLK0 and the case of the logarithmic curve 801 shown in FIG. 8. For example, the logarithmic curve is a logarithmic curve in which a count value=log 2 (TCLK0). FIG. 9B shows the case of the high-illuminance time clock TCLK1 and the case of the logarithmic curve 802 shown in FIG. 8. Intervals in the time clock TCLK1 are not limited to this example as long as the first half of the exposure time is counted at short intervals.

From the saturation value of 255, one frame of 31 ms, and the time Tms until the saturation value is reached, the number of photons P per frame is calculated by the following formula.

$$P = 255 \times 31 / T \quad \text{(Formula 2)}$$

The calculation of Formula 2 may be performed in a dedicated circuit by providing the circuit in the readout circuit area 23 or may be performed in the post-processing (not shown).

In the first embodiment, a count value of 0 corresponds to a lapse of 1 ms regardless of whether either one of the low-illuminance time clock TCLK0 or the high-illuminance time clock TCLK1 is used to count. Substituting T=1 into Formula 2 yields P=7905, which is a theoretical dynamic range of the number of photons.

The high-illuminance time clock TCLK1 counts the first half of the exposure time at shorter intervals as compared to the low-illuminance time clock TCLK0. For example, in a case where saturation occurs in 1.5 ms in the case of high illuminance, the count value is 1 regardless of whether either one of the low-illuminance time clock TCLK0 or the high-illuminance time clock TCLK1 is used to count.

On the other hand, a count value of 1 of the low-illuminance time clock TCLK0 corresponds to a lapse of 3 ms, while a count value of 1 of the high-illuminance time clock TCLK1 corresponds to a lapse of 2 ms. Based on elapsed time of 3 ms corresponding to the count value of 1 of the low-illuminance time clock TCLK0, substituting T=3 into Formula 2 yields P=2635. Based on elapsed time of 2 ms corresponding to the count value of 1 of the high-illuminance time clock TCLK1, substituting T=2 into Equation 2 yields P=3953 (rounded off to the nearest integer).

Based on actual elapsed time of 1.5 ms, substituting T=1.5 into Formula 2 yields P=5270. That is, while the actually expected number of photons per frame P=5270, P=2635 is calculated using the low-illuminance time clock TCLK0 and P=3953 is calculated using the high-illuminance time clock TCLK1. That is, in a case where saturation occurs in 1.5 ms in the case of high illuminance, using the high-illuminance time clock TCLK1 can reduce an error from the actually expected number of photons per frame.

According to the first embodiment, in a case where the illuminance is determined to be high, the time counter 222 counts using the high-illuminance time clock TCLK1 that counts the first half of the exposure time at short intervals. Thus, even in a case where the number of photons reaches the threshold at an early time in one frame in the case of high illuminance, it is possible to reduce an error between the number of photons per frame calculated from the time information and the number of photons and the actually expected number of photons per frame.

Second Embodiment

In the first embodiment, the time clocks are switched in units of one pixel. In contrast, in the second embodiment, the time clocks are switched in units of a plurality of pixels. For example, four pixels of RGGB can be used as one unit, or in addition to RGB pixels, four pixels of RGBW including a W (white) pixel with higher sensitivity can be used as one unit. Here, in order to facilitate description, the time clocks are switched in units of four pixels, but the number of pixels in a unit may be, for example, 16 and is not limited to four.

Figure 10:
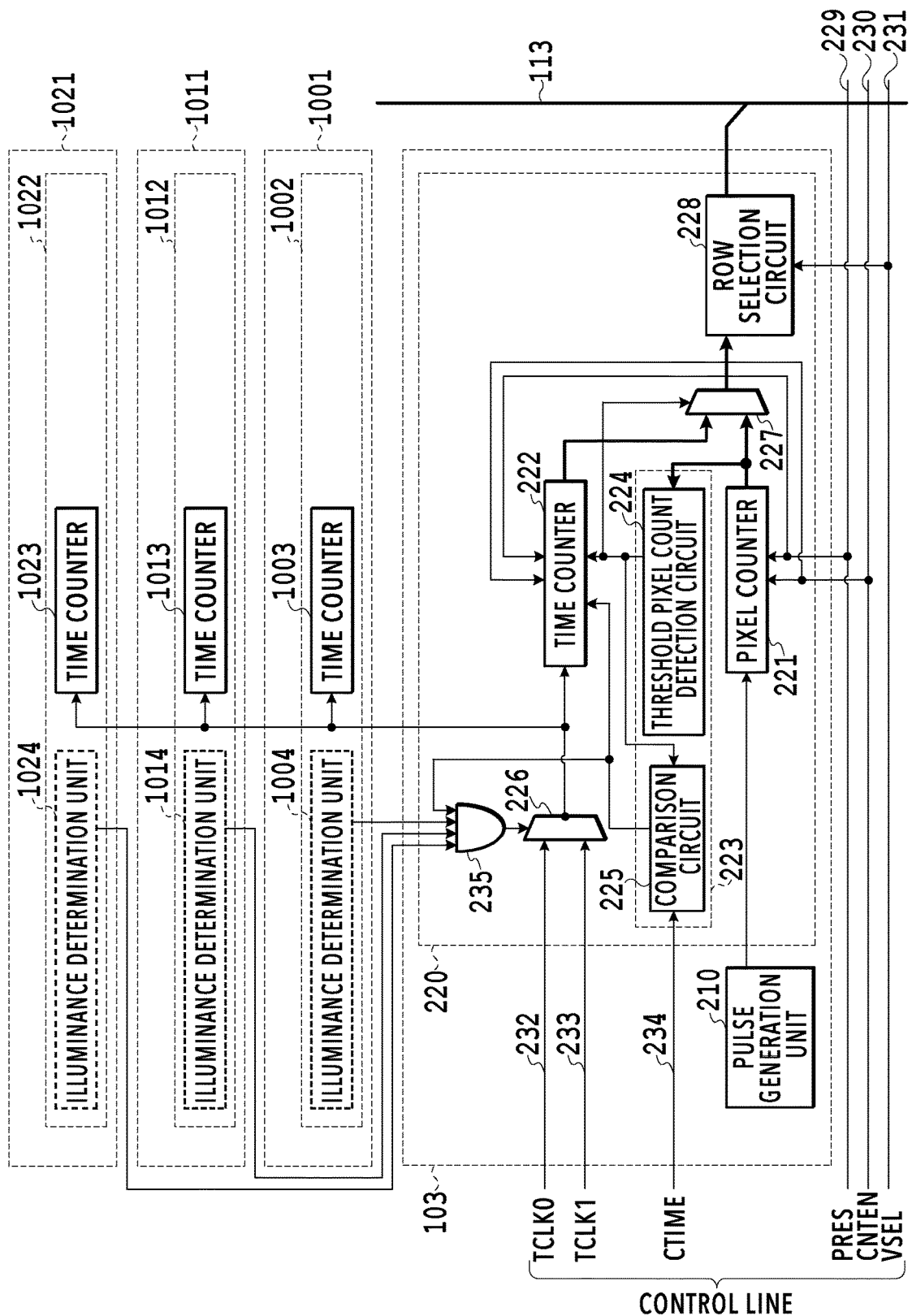
FIG. 10 is a diagram showing a configuration example of a signal processing unit according to a second embodiment.

FIG. 10 is a diagram showing a configuration example of a signal processing unit according to the second embodiment. Hereinafter, the descriptions of the portions described in the first embodiment will be omitted. Four signal processing units 103, 1001, 1011 and 1021 corresponding to four pixels share the time clocks supplied to the time counters in the respective pulse processing units 220, 1002, 1012 and 1022. These four pixels may form a Bayer array.

Outputs from the illuminance determination units 223, 1004, 1014, and 1024 for each pixel are AND-operated by an AND circuit 235 and supplied to the selector 226. In a case where each illuminance determination unit determines that the illuminance is high, 1 is output, and in a case where each illuminance determination unit determines that the illuminance is low, 0 is output. The AND circuit 235 outputs 1 in a case where it is determined that all four pixels have high illuminance, and the selector 226 selects the high-illuminance time clock TCLK1. On the other hand, 0 may be output in a case where each illuminance determination unit determines that the illuminance is high, 1 may be output in a case where each illuminance determination unit determines that the illuminance is low, and the AND circuit 235 may be an OR circuit.

The time counters 222, 1103, 1013, and 1023 for each pixel are supplied with the same time clock selected by the selector 226.

In the second embodiment, since the selector 226 can be shared among a plurality of pixels, a circuit scale can be reduced.

In a case where different time clocks for adjacent pixels are used to count, there is a possibility that a difference in gradation may appear as a step or flicker in a case where all of the adjacent pixels are saturated early. In the second embodiment, such a step or flicker can be suppressed by sharing the time clocks among a group of a certain number of pixels.

In the second embodiment, four pixels are used as a unit, and the formation of a Bayer array unit is mentioned as an example. However, the formation may be made with units of multiple rows or multiple columns, and it is not necessary to form the entire screen uniformly with the same unit.

Third Embodiment

In the first and second embodiments, the time counters are provided in units of one pixel. On the other hand, in the third embodiment, one time counter is provided in units of a plurality of pixels. In order to facilitate description, one time counter is provided in units of four pixels, but the number of pixels in a unit may be, for example, 16, and is not limited to four.

Figure 11:
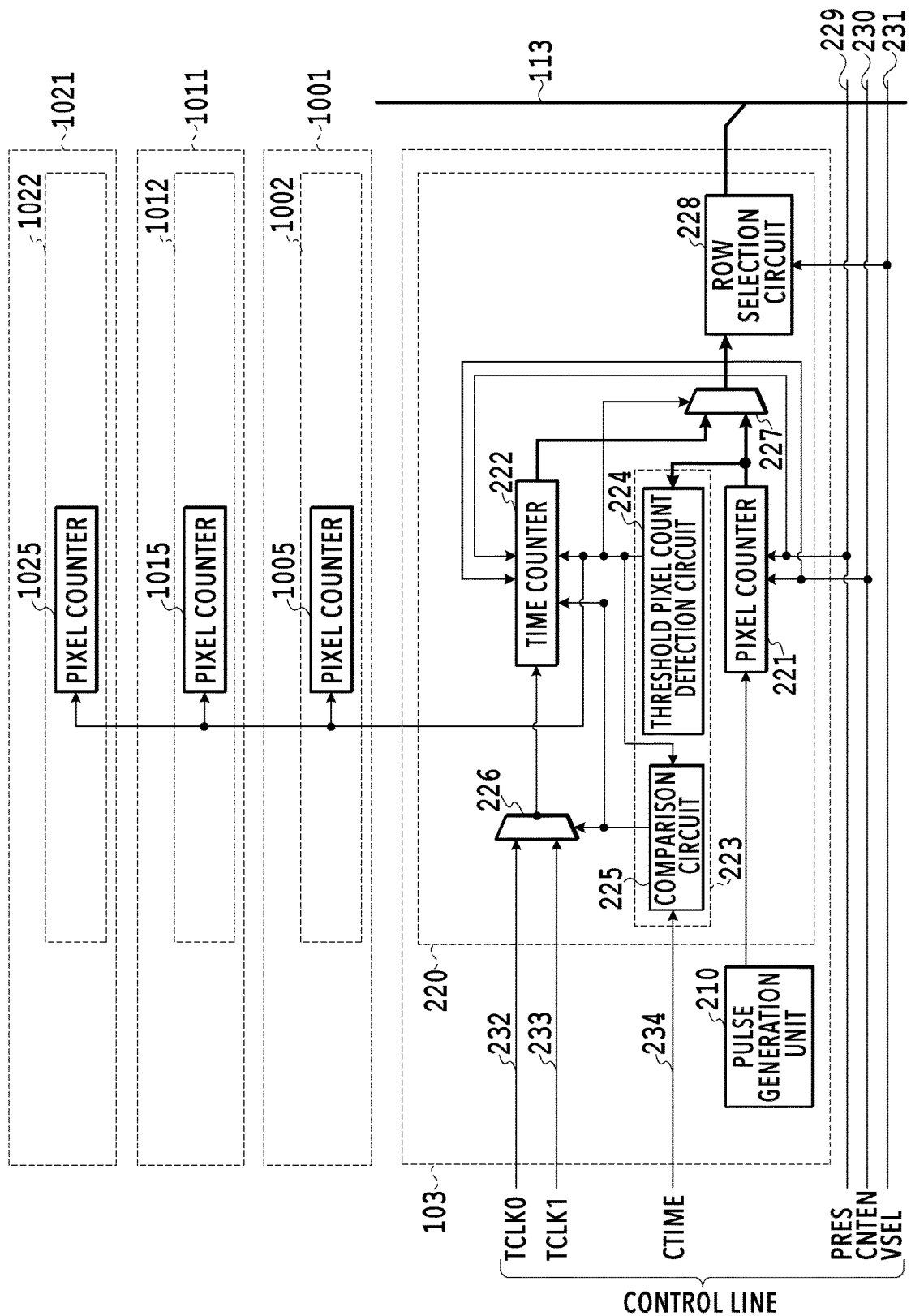
FIG. 11 is a diagram showing a configuration example of a signal processing unit according to a third embodiment.

FIG. 11 is a diagram showing a configuration example of a signal processing unit according to the third embodiment. Hereinafter, the descriptions of the portions described in the first embodiment will be omitted. The four signal processing units 103, 1001, 1011, and 1021 corresponding to four pixels share the result of determination by the illuminance determination unit 223 in the respective pulse processing units 220, 1002, 1012, and 1022. For example, four pixels of RGBW may be used as one unit, and these four pixels may form the Bayer array.

For example, a W pixel 101 connected to the signal processing unit 103 is not mounted with a color filter, and the other three pixels of RGB are mounted with color filters. Such mounting allows the pixel counter 221 of the signal processing unit 103 for the W pixel with the highest sensitivity to saturate earlier than the other pixel counters 1005, 1015, and 1025.

In the case of detecting that the pixel counter 221 has reached the saturation value, the threshold pixel count detection circuit 224 of the illuminance determination unit 223 notifies the time counter 222 and the pixel counters 1005, 1015, and 1025.

As in the first embodiment, the time counter 222 stops counting in the case of being notified by the threshold pixel count detection circuit 224 that the pixel counter 221 has reached the saturation value within the period of one frame. Similarly, the pixel counters 1005, 1015, and 1025 stop counting in the case of being notified by the threshold pixel count detection circuit 224 that the pixel counter 221 has reached the saturation value within the period of one frame.

In the third embodiment, since the pixel counter 221 is saturated first, the pixel counters 1005, 1015, and 1025 are never saturated first. Thus, the output formats of the signal processing units 1001, 1011, and 1021 are always the output format 601 in FIGS. 6A and 6B. The output format of the signal processing unit 103 is, for example, the output format 602 in FIGS. 6A and 6B. The number of photons P per frame is calculated based on the count value of the time counter 222 of the signal processing unit 103 for the W pixel which is not mounted with any color filter. On the other hand, in the case of saturation, calculation is performed not only for the W pixel but also for each pixel of RGB.

In the third embodiment, the pixel counter 221 saturates earlier than the pixel counters 1005, 1015, and 1025 in the formation of four pixels of RGBW. However, in any pixel formation, in a case where any pixel counter saturates, the time counter 222 and the other pixel counters may be stopped.

According to the third embodiment, the pixel counters 1005, 1015, and 1025 of the pulse processing units 1002, 1012, and 1022 never saturate and thus never output count values of the time counters. Accordingly, the time counters, TCLK selector, and illuminance determination unit can be omitted in the pulse processing units 1002, 1012, and 1022. The time counter 222 is, for example, a 14-bit counter and has a large circuit scale, and in a case where the time counter 222 is mounted on the pulse processing units for each pixel, a pixel size becomes large. On the other hand, in the third embodiment, since one time counter 222 can be used for a plurality of pixels, it is possible to reduce a pixel size and increase a resolution.

In the third embodiment, four pixels are used as a unit, and the Bayer array unit formation is mentioned as an example. However, the time counter 222 may be shared in units of a row, in units of multiple rows, in units of a column, or in units of multiple columns.

Fourth Embodiment

An example of imaging apparatuses to which the imaging sensor 100 is applied is a digital camera. In the fourth embodiment, in accordance with conditions for imaging with a digital camera, the post-processing (not shown) controls the control pulse generation unit 115 in FIG. 3 to control one-count time of the time clocks (TCLK0/TCLK1).

Specifically, in the case of setting the aperture value (F value) of a lens of the digital camera small, the illuminance tends to be high. Then, ratios at which one-count time in the low-illuminance time clock TCLK0 and the high-illuminance time clock TCLK1 is gradually extended are switched depending on the aperture value (F value).

Figure 12:
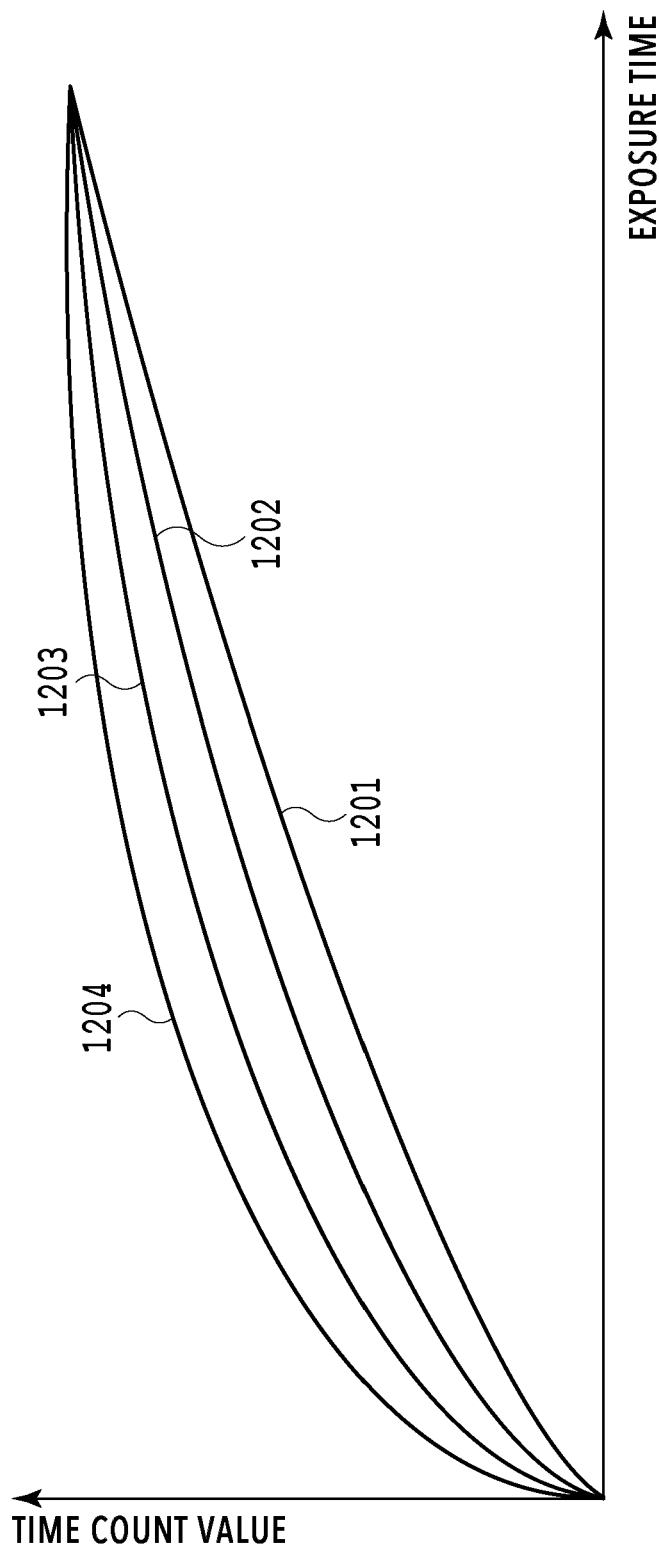
FIG. 12 is a diagram showing a plurality of relationships between an exposure time and a time count value according to a fourth embodiment.

FIG. 12 is a diagram showing a plurality of relationships between exposure time and a time count value according to the fourth embodiment. The vertical axis represents the time count value, and the horizontal axis represents the exposure time. In a case where the aperture value (F value) of the digital camera is in a range of 1.4 to 2.8, the low-illuminance time clock TCLK0 counts according to a logarithmic curve 1203, and the high-illuminance time clock TCLK1 counts according to a logarithmic curve 1204. In a case where the aperture value (F value) of the digital camera is in a range of 4 to 5.6, the low-illuminance time clock TCLK0 counts according to a logarithmic curve 1202, and the high-illuminance time clock TCLK1 counts according to the logarithmic curve 1203. In a case where the aperture value (F value) of the digital camera is in a range of 8 to 16, the low-illuminance time clock TCLK0 counts according to a logarithmic curve 1201, and the high-illuminance time clock TCLK1 counts according to the logarithmic curve 1202. It should be noted that the aperture value (F value) ranges and the selection of a logarithmic curve are examples, and are not limited to them.

In the post-processing (not shown), each of the logarithmic curves 1201, 1202, 1203, and 1204 in FIG. 12 is stored in a buffer or the like, selected depending on an aperture value (F value), and set in the control pulse generation unit 115 in FIG. 3.

This enables not only feedback control by the illuminance determination unit but also feedforward control depending on an aperture value (F value). As a result, as in the first embodiment, it is possible to further reduce an error between the number of photons per frame calculated from Formula 2 and the actually expected number of photons per frame.

In the fourth embodiment, the description has been given using the conditions for imaging with a digital camera as an example, but any imaging conditions that affect the determination of illuminance can be applied.

According to the exemplary embodiments, in a case where illuminance is high, it is possible to reduce an error between the number of photons per frame calculated from time information and the number of photons and the actually expected number of photons per frame.

This application claims the benefit of Japanese Patent Application No. 2021-186602, filed Nov. 16, 2021 which is hereby incorporated by reference wherein in its entirety.

What is claimed is:

1. A sensor in which a pixel including a conversion unit configured to detect incidence of a photon and a processing unit configured to process a pulse generated by photon detection in the conversion unit are arranged two-dimensionally, the sensor comprising:
   a time counter configured to count a clock from a start of exposure in one frame;
   a pixel counter configured to count a number of pulses from the start of exposure in the one frame;
   at least one processor;
   a memory coupled to the at least one processor storing instructions that, when executed by the at least on processor, cause the at least one processor to function as:
   a determination unit configured to determine whether a counter value of the pixel counter reaches a threshold within the one frame; and
   a selector configured to switch the clock according to a result of determination by the determination unit,
   wherein the clock includes a first clock selected by the selector by determining that the illuminance is high and a second clock selected by the selector by determining that the illuminance is low,
   wherein the determination unit comprises:
   a detection circuit configured to detect that the pixel counter reaches the threshold; and
   a comparison circuit configured to compare a detection timing at which the detection circuit detects that the threshold is reached with a reception timing of a control signal supplied from a generation unit,
   wherein in a case where the detection timing is earlier than the reception timing, the illuminance is determined to be high, and in a case where the detection timing is equal to or later than the reception timing and in a case where the detection circuit does not detect that the threshold is reached, the illuminance is determined to be low, and
   wherein one-count time of the first clock is set more minutely in a first half of the one frame than one-count time of the second clock.

2. The sensor according to claim 1, wherein one-count time of the clock increases each time the time counter is incremented.

3. An apparatus using the sensor according to claim 2, wherein a ratio at which the one-count time of the clock increases in accordance with a condition is set.

4. The sensor according to claim 1, wherein the threshold is a maximum value countable by the pixel counter.

5. The sensor according to claim 1, wherein there are a plurality of selectors including the selector in a plurality of processing units corresponding to a plurality of conversion units, respectively, each selector of the plurality of selectors switches the clock according to a result of determination by any one determination unit of the plurality of processing units.

6. The sensor according to claim 1, wherein according to a result of determination by a determination unit of a first processing unit corresponding to a first conversion unit, a pixel counter of one or more processing units corresponding to one or more other conversion units, respectively is stopped.

7. A method in a sensor in which a pixel including a conversion unit configured to detect incidence of a photon and a processing unit configured to process a pulse generated by photon detection in the conversion unit are arranged two-dimensionally, the method comprising:

counting a clock by a time counter from a start of exposure in one frame;

counting a number of pulses by a pixel counter from the start of exposure in the one frame;

determining whether a count value of the pixel counter reaches a threshold within the one frame; and switching the clock supplied to the time counter in a case where it is determined that the threshold is reached, wherein the clock includes a first clock selected by determining that the illuminance is high and a second clock by determining that the illuminance is low, and wherein the determining comprises:

detecting that the pixel counter reaches the threshold; and comparing a detection timing at which the detecting detects that the threshold is reached with a reception timing of a control signal supplied from a generating, wherein in a case where the detection timing is earlier than the reception timing, the illuminance is determined to be high, and in a case where the detection timing is equal to or later than the reception timing and in a case where the detecting does not detect that the threshold is reached, the illuminance is determined to be low, and wherein one-count time of the first clock is set more minutely in a first half of the one frame than one-count time of the second clock.

8. The method according to claim 7, wherein one-count time of the clock increases each time the time counter is incremented.

9. The method according to claim 8, wherein a ratio at which the one-count time of the clock increases in accordance with a condition is set.

10. The method according to claim 7, wherein the threshold is a maximum value countable by the pixel counter.

11. The method according to claim 7, wherein in a plurality of processing corresponding to a plurality of conversing, respectively, each selecting of the plurality of processing switches the clock according to a result of determination by any one determining of the plurality of processing.

12. The method according to claim 7, wherein according to a result of determination of a first processing corresponding to a first conversing, a pixel counter of one or more processing corresponding to one or more other conversing, respectively is stopped.

* * * * *